(12) United States Patent
Engstrom et al.

(10) Patent No.: US 6,954,658 B2
(45) Date of Patent: Oct. 11, 2005

(54) LUMINESCENT SIGNALING DISPLAYS UTILIZING A WIRELESS MOBILE COMMUNICATION DEVICE

(75) Inventors: G. Eric Engstrom, Kirkland, WA (US); Peter Zatloukal, Kirkland, WA (US)

(73) Assignee: Wildseed, Ltd., Kirkland, WA (US)

( * ) Notice: Subject to any disclaimer, the term of this patent is extended or adjusted under 35 U.S.C. 154(b) by 41 days.

(21) Appl. No.: 10/334,736

(22) Filed: Dec. 31, 2002

(65) Prior Publication Data

US 2003/0100332 A1 May 29, 2003

Related U.S. Application Data

(63) Continuation-in-part of application No. 09/908,118, filed on Jul. 17, 2001.

(51) Int. Cl.[7] ............................. G09G 3/00; H04Q 7/32
(52) U.S. Cl. ................. 455/567; 455/550.1; 455/553.1; 340/815.4; 345/31
(58) Field of Search .............................. 455/567, 550.1, 455/553.1, 90.2, 90.3, 550; 340/815.4; 345/3.1, 31

(56) References Cited

U.S. PATENT DOCUMENTS

| | | | |
|---|---|---|---|
| 5,273,437 A | | 12/1993 | Caldwell et al. |
| 5,444,456 A | | 8/1995 | Ohta et al. |
| 5,726,701 A | | 3/1998 | Needham |
| 5,738,583 A | | 4/1998 | Comas et al. |
| 5,748,157 A | * | 5/1998 | Eason .......................... 345/31 |
| 5,993,314 A | | 11/1999 | Dannenberg et al. |
| 6,265,984 B1 | * | 7/2001 | Molinaroli ................ 340/815.4 |
| 6,404,409 B1 | * | 6/2002 | Solomon ...................... 345/31 |

\* cited by examiner

*Primary Examiner*—Nick Corsaro
*Assistant Examiner*—Alan T. Gantt
(74) *Attorney, Agent, or Firm*—Schwabe, Williamson & Wyatt, P.C.

(57) ABSTRACT

The present invention includes a wireless mobile communication device with a body casing having an exterior surface, and a number of light sources (LS) disposed on the exterior surface. A machine accessible medium is provided with instructions to selectively activate the number of LS in a spatial movement dependent manner to spatially paint luminescent images. Additionally, a processor is coupled to the machine accessible medium to execute the instructions. As a result, spatial painting of luminescent images utilizing a wireless mobile communication device is facilitated.

16 Claims, 13 Drawing Sheets

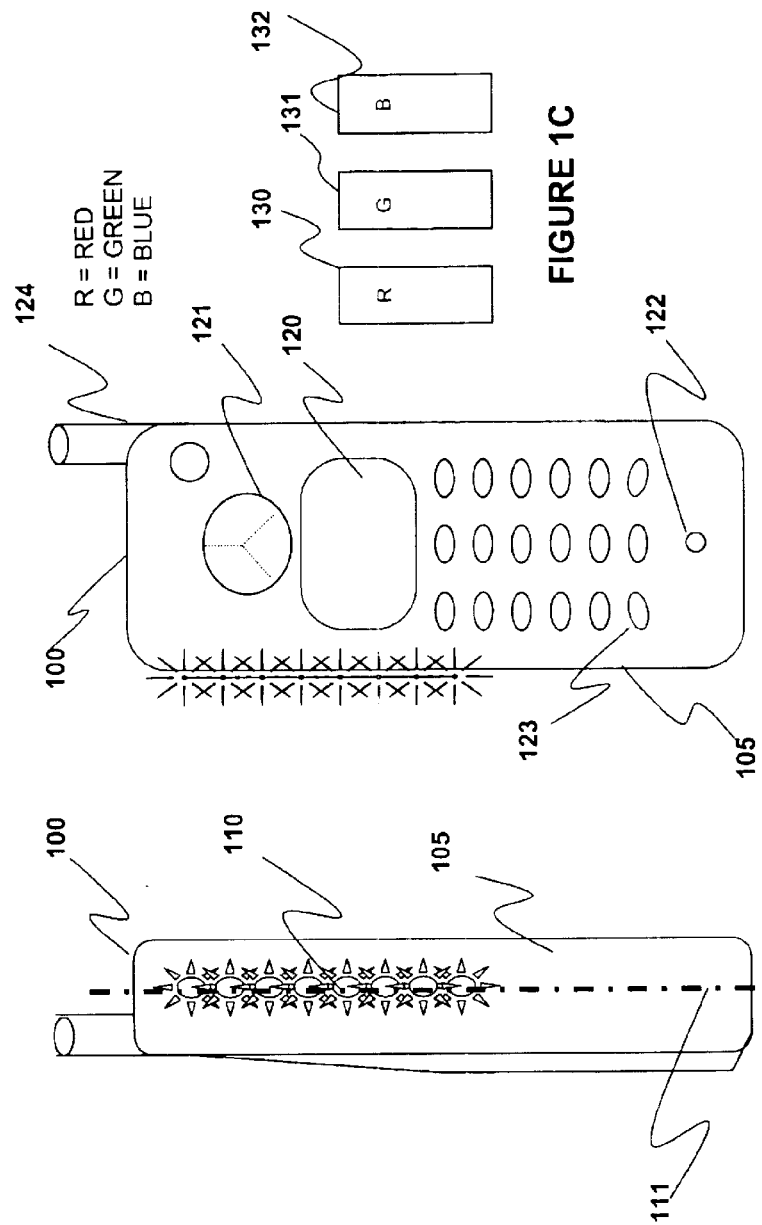

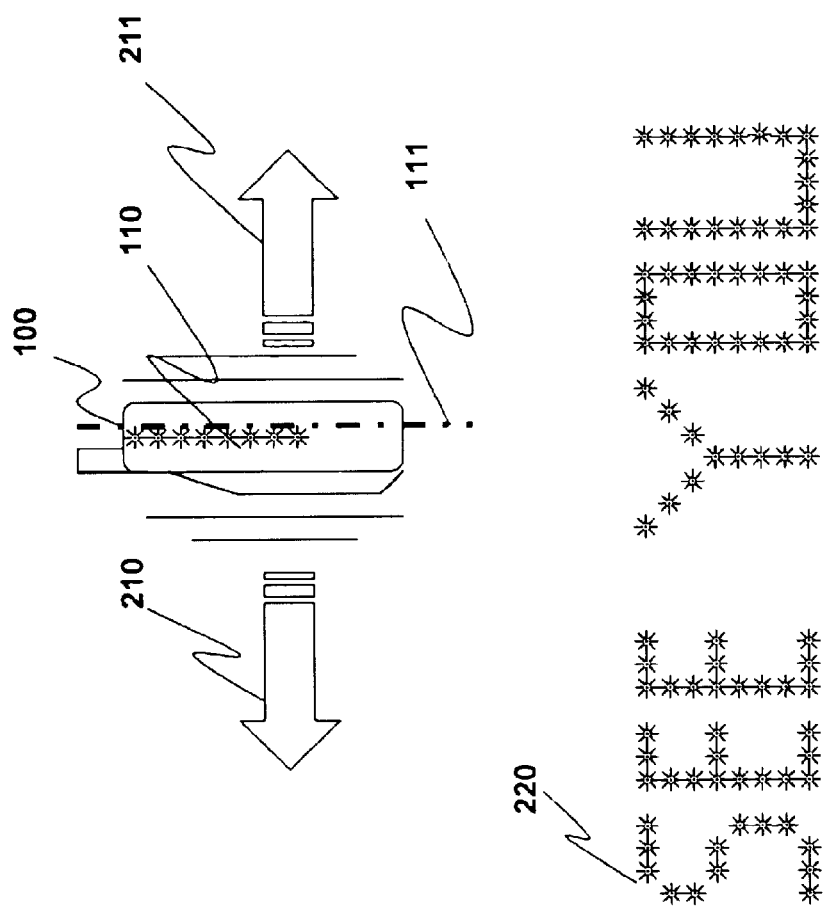

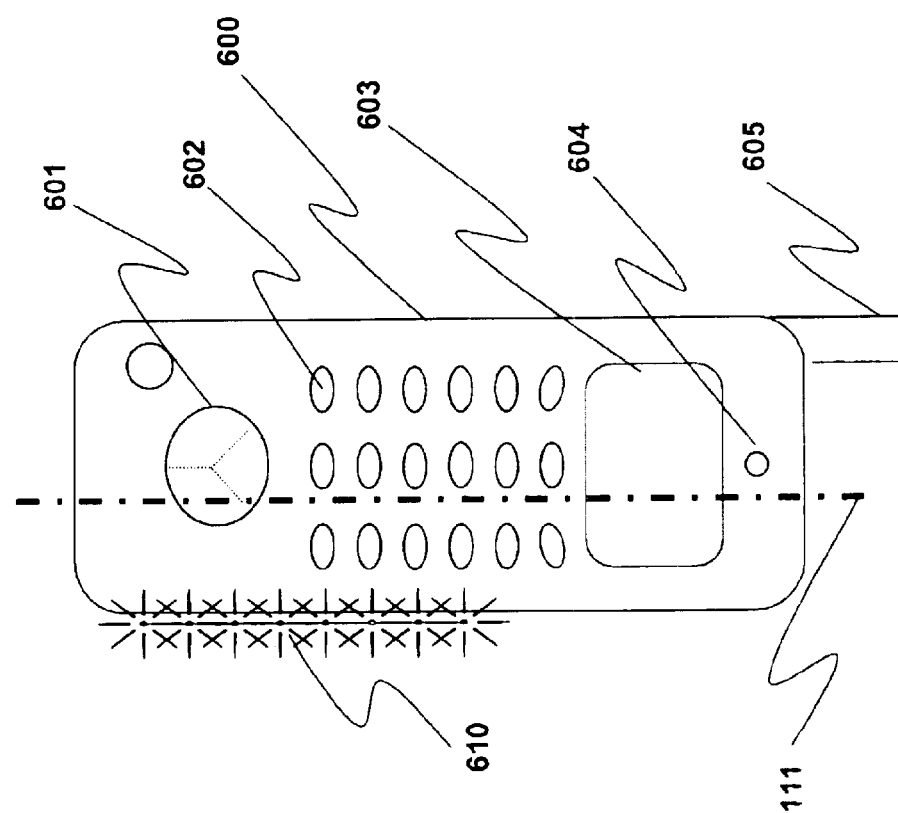

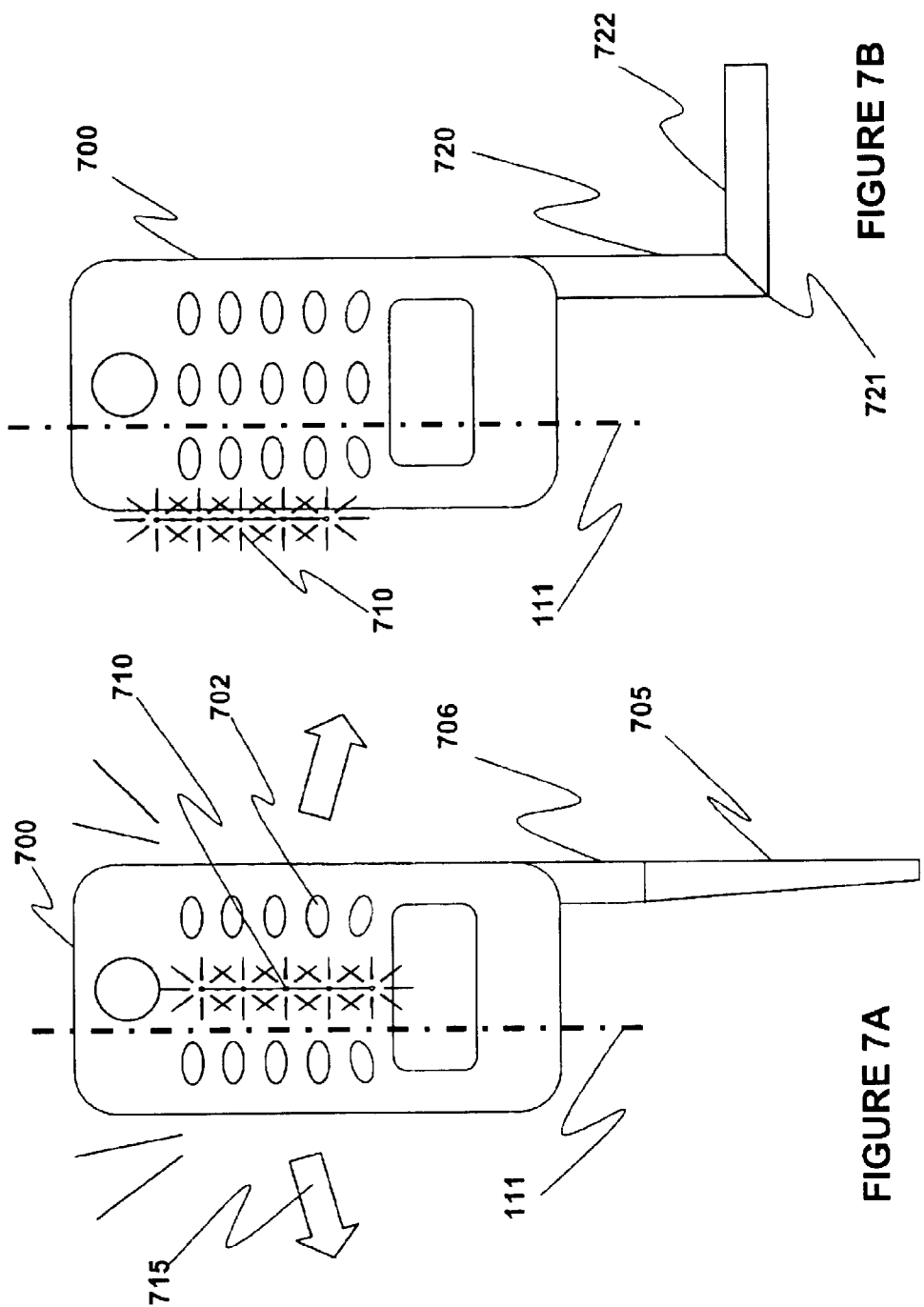

LUMINESCENT SIGNALING DISPLAYS UTILIZING A WIRELESS MOBILE COMMUNICATION DEVICE

RELATED APPLICATION

This application is a continuation-in-part application of application Ser. No. 09/908,118, filed Jul. 17, 2001, having the same title and inventorship.

FIELD OF PRESENT INVENTION

The present invention relates to the field of wireless mobile communication device. More specifically, the present invention relates to facilitating luminescent signaling displays utilizing a wireless mobile communication device.

BACKGROUND OF THE PRESENT INVENTION

Advances in integrated circuit and telecommunication technology have led to wide spread adoption of wireless mobile client devices, in particular, wireless mobile communication devices. Wireless mobile communication devices, such as wireless mobile phones, offer the advantage of enabling their users to be communicatively reachable by their business associates, friends and family members, wherever the users may be, as long as they are within the reach of the service networks. Because the wireless mobile phone is prevalent, often times, users consider wireless mobile phones as their first medium of communication, even if a traditional wired line telephone is available, such as, in a users home. It is often the case, where a user will pick up their wireless mobile phone before they pick up their traditional wired line telephone. Thus, even non-professionals are increasingly dependent on their wireless mobile phones to meet their communication needs. However, there may be situations where traditional functions of a wireless mobile phone may be inadequate for a user's communication needs.

For example, if a user is within visual range of another person, with whom the user wishes to communicate, the user may talk very loudly. Talking very loudly may be ineffective if the area is noisy. Another method may be to use hand signals, which may be ineffective to convey a message due to the cryptic nature of hand signals. Making a large physical sign for display may be another method, but again, this method may be ineffective if the area is relatively dark.

The user may use a wireless mobile phone to call the other person; however, calling the other person will require the other person to have his/her own wireless mobile phone. It also requires knowledge of the other person's phone number. Additionally, the difficulties of communicating in less than ideal conditions, such as noisy conditions, will not be resolved by calling the other person using the wireless mobile phone.

The afore described difficulties with using wireless mobile phones apply equally to other wireless mobile communication devices, such as, wireless mobile pagers, instant messengers, and so forth.

Note: The term "wireless mobile phone" as used herein (in the specification and in the claims) refers to the class of telephone devices equipped to enable a user to make and receive calls wirelessly, notwithstanding the user's movement, as long as the user is within the communication reach of a "service station" of a wireless telephony service provider. Unless specifically excluded, the term "wireless mobile phone" is to include the analog subclass as well as the digital subclass (of all signaling protocols). Further, wireless mobile communication devices will simply be referred to as wireless mobile devices or wireless communication devices. Unless the specific context requires otherwise, in the general context of this application, the two terms are used interchangeably.

BRIEF DESCRIPTION OF DRAWINGS

The present invention is illustrated by way of example and not by way of limitation in the figures of the accompanying drawings, in which like references indicate similar elements and in which:

FIGS. 1A–1C illustrate one embodiment of a wireless mobile device, specifically, a wireless mobile phone, incorporated with the teachings of the present invention;

FIGS. 2a–2b illustrate exemplary luminescent images facilitated utilizing a wireless mobile phone, in accordance with one embodiment of the present invention;

FIG. 6 illustrates facilitation of spatial painting of luminescent images utilizing a wireless mobile phone in an alternate configuration;

FIGS. 7A & 7B illustrate means for augmenting motion of a wireless mobile phone utilized to spatially paint a luminescent image, in accordance with one embodiment of the present invention;

DETAILED DESCRIPTION OF THE PRESENT INVENTION

Figure 2B:
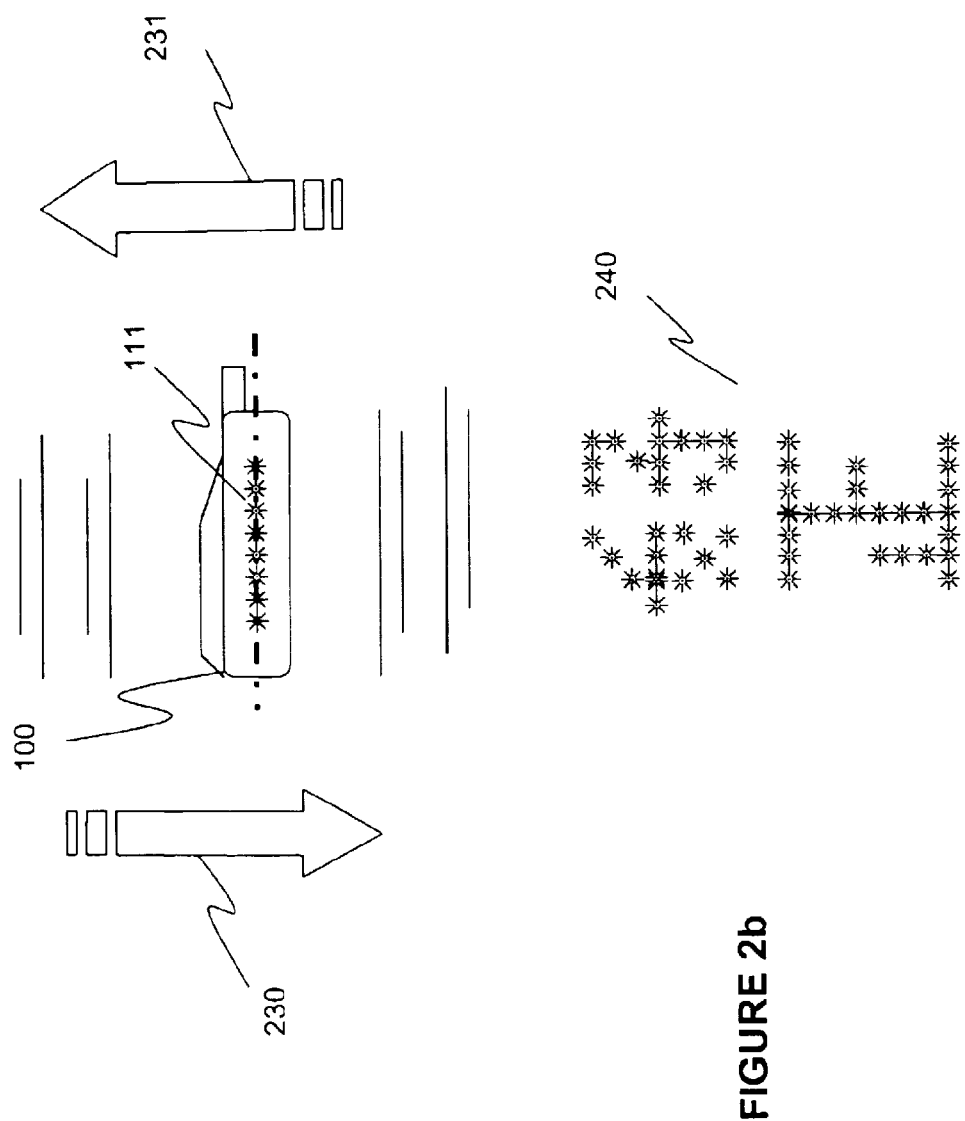

For ease of understanding, the present invention will be described in the context of wireless mobile phones.

However, it is anticipated that the present invention may be practiced on all wireless mobile devices, i.e. phones, pagers, instant messengers and other devices of the like. Thus, the references to wireless mobile phones in the description are merely illustrative, and are not to be read as limitations on the claims.

In the following description, various embodiments of the present invention will be described. However, it will be apparent to those skilled in the art that the present invention may be practiced with only some or all aspects of the described embodiments. For purposes of explanation, specific numbers, materials and configurations are set forth in order to provide a thorough understanding of the present invention. However, it will also be apparent to one skilled in the art that the present invention may be practiced without these specific details. In other instances, well-known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical electrical, and/or optical components of the computer system, and the term computer system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

In various embodiments of the present invention, generating and displaying luminescent images are facilitated utilizing a wireless mobile phone.

FIGS. 1A–1C illustrate one embodiment of a wireless mobile device, specifically, wireless mobile phone, incorporated with the teachings of the present invention. As illustrated in a side view of a wireless mobile phone in FIG. 1A, wireless mobile phone 100 is provided with a number of light emitting diodes (LEDs) 110 disposed on side surface 105 of the body casing of the wireless mobile phone 100 in a substantially columnar manner, along an imaginary longitudinal axis 111 of the wireless mobile phone 100. For the illustrated embodiment, eight (8) LEDs are provided and disposed in a substantially linear manner. In one embodiment, nine (9) LEDs are provided and disposed in a substantially linear manner. In alternate embodiments, more or less LEDs may be provided and/or arranged in other geometric configurations instead, as well as disposed in other or multiple exterior surfaces of the wireless mobile phone 100, including the top or bottom surface, the front or back surface, and combinations thereof. Further, while the present invention is being described in terms of LEDs, the term as used in this application (including the claims) is to be broadly construed to include all lighting sources of like kind. In other words, it is anticipated that the present invention may be practiced with other similar light sources beside LEDs.

Shown in FIG. 1B, a frontal view of the wireless mobile phone 100 includes display area 120, a speaker area 121, a microphone area 122, various keys 123 having alphanumeric functions, and an optional antenna 124. A user (not shown) may select or enter a desired image, such as, for example, the textual image "SEE YOU," by methods utilizing the various keys 123. This image may be displayed on the display area 120 for the user, providing feedback to the user on the selected or entered image. However, by virtue of the typical relatively small dimension of display area 120, this image on the display area 120 of wireless mobile phone 100 is too small to convey the image to other people visually, unless the other users have the wireless mobile phone 100 directly in front of them. In accordance with the present invention, the image may be conveyed to other people or users visually as a spatially painted luminescent image using LEDs 110 and complementary logic (e.g. block 907 of FIG. 9).

Each of the LEDs 110, shown in FIGS. 1A & 1B, may represent various types of LEDs that alone or in combination with other LEDs form a single pixel of the spatially painted luminescent image. For example, each of the LEDs 110 may be one single-color LED, or one multi-color LED (i.e., a single LED that can light in different colors). In one embodiment, each pixel is formed using three single color LEDs. The three single colors are red 130, green 131, and blue 132 (shown in FIG. 1C).

In the embodiments shown, the LEDs 110 are employed to facilitate spatial painting of luminescent images utilizing the wireless mobile phone 100. As will be described below, images may include visual images, such as, but not limited to alphanumeric characters, words, phrases, shapes, and animated images, each in a single color or in a mixture of colors.

FIG. 2a illustrates an exemplary luminescent image facilitated utilizing a wireless mobile phone, in accordance with one embodiment of the present invention. As shown in FIG. 2, the wireless mobile phone 100 having the LEDs 110 embedded in the body casing in the aforementioned manner is spatially moved horizontally in a side-to-side motion. More specifically, the spatial movement spans a plane substantially perpendicular to an intended recipient's line of vision. As the wireless mobile phone 100 is moved side-to-side in the described horizontal manner, the LEDs 110 are selectively activated, i.e., turned on and off, in various patterns in a manner timed to coordinate with the spatial movement to effectuate formation of a luminescent image 220, visible to the recipient.

The side-to-side motion may be achieved by a number of alternate mechanisms. In one technique, the user holds the wireless mobile phone 100 in one hand, with the LEDs 110 directed towards the intended recipient of the luminescent image 220 and the longitudinal axis 111 of the wireless mobile phone 100 oriented approximately vertical, and moves the wireless mobile phone 100 side-to-side horizontally. The side-to-side motion includes moving the mobile phone 100 in a first direction 210 horizontally, then reversing the direction, and moving the mobile phone in an opposite direction 211, also horizontally. The reversal of directions can be repeated a number of times. An image or a string of text may be repeatedly painted upon each movement in a single direction. Alternatively, the image or string of text may change upon reversal of directions, in order to spell out a longer string of text or a sequence of images. The luminescent image 220 is perceptually sustained, as the wireless mobile phone 100 is moved in the side-to-side motion horizontally, and the LEDs are repeatedly activated/deactivated in a spatial movement dependent manner.

The luminescent image 220 (shown in FIG. 2) is painted utilizing the wireless mobile phone 100 by selectively activating LEDs 110 (turning on and off) at a rate appropriate for a phenomenon known as persistence of vision. Persistence of vision is a phenomenon that allows a human eye to see a trail of light when a person moves a light source around in the dark.

Thus, as the wireless mobile phone 100 is moved in the side-to-side motion at a faster rate, in most circumstances, the luminescent image 220 generally becomes clearer and sharper. However, if the wireless mobile phone 100, having the LEDs 110, is moved slower in the side-to-side motion horizontally, in most circumstances, the luminescent image 220 generally becomes less clear. The viewer, instead of seeing a steady image, may see a flickering or blurred luminescent image. The persistence of vision phenomenon is known, and accordingly, will not be discussed in further detail.

In one embodiment, an accelerometer (shown as ref. 950 in FIG. 9) may be utilized to determine the motion of the wireless mobile phone 100. The accelerometer is employed to aid in coordinating the selective activation of LEDs 110, to spatially paint a relatively clear luminescent image 220 at relatively slower side-to-side motions. The accelerometer measures the rate at which the speed of an object is changing, i.e., its acceleration, by measuring the forces exerted on its components, and these measurements are commonly transferred into electrical signals. The signals of the accelerometer can be used to determine when the wireless mobile phone reverses directions. Additionally, the accelerometer may aid in indicating movements in different directions.

For example, referring to FIG. 2a, the accelerometer may aid in indicating changes in direction of motion between the first direction 210, and the second direction 211 (i.e., left to right and right to left). Indicating changes in direction facilitates spatial painting of luminescent images corresponding to the direction of motion. For example, in FIG. 2, the luminescent image 220 may be spatially painted to be viewed in one direction, i.e., the LEDs are activated based on direction of motion to prevent differing images corresponding to the two directions 210 and 211, one image in the first direction 210 and a reverse image in the second direction 211. The image is painted in the first direction 210, and then, painted in reverse in direction 211 presenting a backward image. These accelerometers are available in very small sizes, such as, but not limited to, a piezoelectric micro-miniature accelerometers, allowing it to be included in a variety of devices, such as, wireless mobile phone 100.

FIG. 2b illustrates an exemplary luminescent image facilitated utilizing a wireless mobile phone, in accordance with one embodiment of the present invention. As shown in FIG. 2b, the wireless mobile phone 100 having the LEDs 110 embedded in the body casing in the aforementioned manner is spatially moved in a top-to-bottom or bottom-to-top motion, vertically. More specifically, the spatial movement spans a plane substantially perpendicular to an intended recipient's line of vision. As the wireless mobile phone 100 is moved top-to-bottom or bottom-to-top in the described manner, the LEDs 110 are selectively activated, i.e., turned on and off, in various patterns in a manner timed to coordinate with the spatial movement to effectuate formation of a luminescent image 240, visible to the recipient.

The top-to-bottom or bottom-to-top motion may be achieved by a number of alternate mechanisms. In one technique, the user holds the wireless mobile phone 100 in one hand, with the LEDs 110 directed towards the intended recipient of the luminescent image 240 and the longitudinal axis 111 of the wireless mobile phone 100 oriented approximately horizontal, and moves the wireless mobile phone 100 top-to-bottom or bottom-to-top. The top-to-bottom or bottom-to-top motion includes moving the mobile phone 100 in a first direction 230, then reversing the direction, and moving the mobile phone in an opposite direction 231. The reversal of directions can be repeated a number of times. An image or a string of text may be repeatedly painted upon each movement in a single direction. Alternatively, the image or string of text may change upon reversal of directions, in order to paint a longer series of characters or a sequence of images. The luminescent image 240 is perceptually sustained, as the wireless mobile phone 100 is moved in the top-to-bottom and/or bottom-to-top motion, and the LEDs are repeatedly activated/deactivated in a spatial movement dependent manner.

The luminescent image 240 (shown in FIG. 2b) is painted utilizing the wireless mobile phone 100 by selectively activating LEDs 110 (turning on and off) at a rate appropriate for a phenomenon known as persistence of vision. Persistence of vision is a phenomenon that allows a human eye to see a trail of light when a person moves a light source around in the dark.

Thus, as the wireless mobile phone 100 is moved in the top-to-bottom or bottom-to-top motion at a faster rate, in most circumstances, the luminescent image 240 generally becomes clearer and sharper. However, if the wireless mobile phone 100, having the LEDs 110, is moved slower in the top-to-bottom or bottom-to-top motion, in most circumstances, the luminescent image 240 generally becomes less clear. The viewer, instead of seeing a steady image, may see a flickering or blurred luminescent image. The persistence of vision phenomenon is known, and accordingly, will not be discussed in further detail.

In one embodiment, as the earlier described embodiment, an accelerometer (shown as ref. 950 in FIG. 9) may also be utilized to determine the motion of the wireless mobile phone 100. The accelerometer is employed to aid in coordinating the selective activation of LEDs 110, to spatially paint a relatively clear luminescent image 240 at relatively slower top-to-bottom or bottom-to-top motions. The accelerometer measures the rate at which the speed of an object is changing, i.e., its acceleration, by measuring the forces exerted on its components, and these measurements are commonly transferred into electrical signals. The signals of the accelerometer can be used to determine when the wireless mobile phone reverses directions. Additionally, the accelerometer may aid in indicating movements in different directions.

For example, referring to FIG. 2b, the accelerometer may aid in indicating changes in direction of motion between the first direction 230, and the second direction 231 (i.e., top-to-bottom and bottom-to-top). Indicating changes in direction facilitates spatial painting of luminescent images corresponding to the direction of motion. For example, in FIG. 2b, the luminescent image 240 may be spatially painted to be viewed in one direction, i.e., the LEDs are activated based on direction of motion to prevent differing images corresponding to the two directions 230 and 231, one image in the first direction 230 and a reverse image in the second direction 231. The image is painted in the first direction 230, and then, painted in reverse in direction 231 presenting a backward image. These accelerometers are available in very small sizes, such as, but not limited to, a piezoelectric micro-miniature accelerometers, allowing it to be included in a variety of devices, such as, wireless mobile phone 100.

Figure 3:
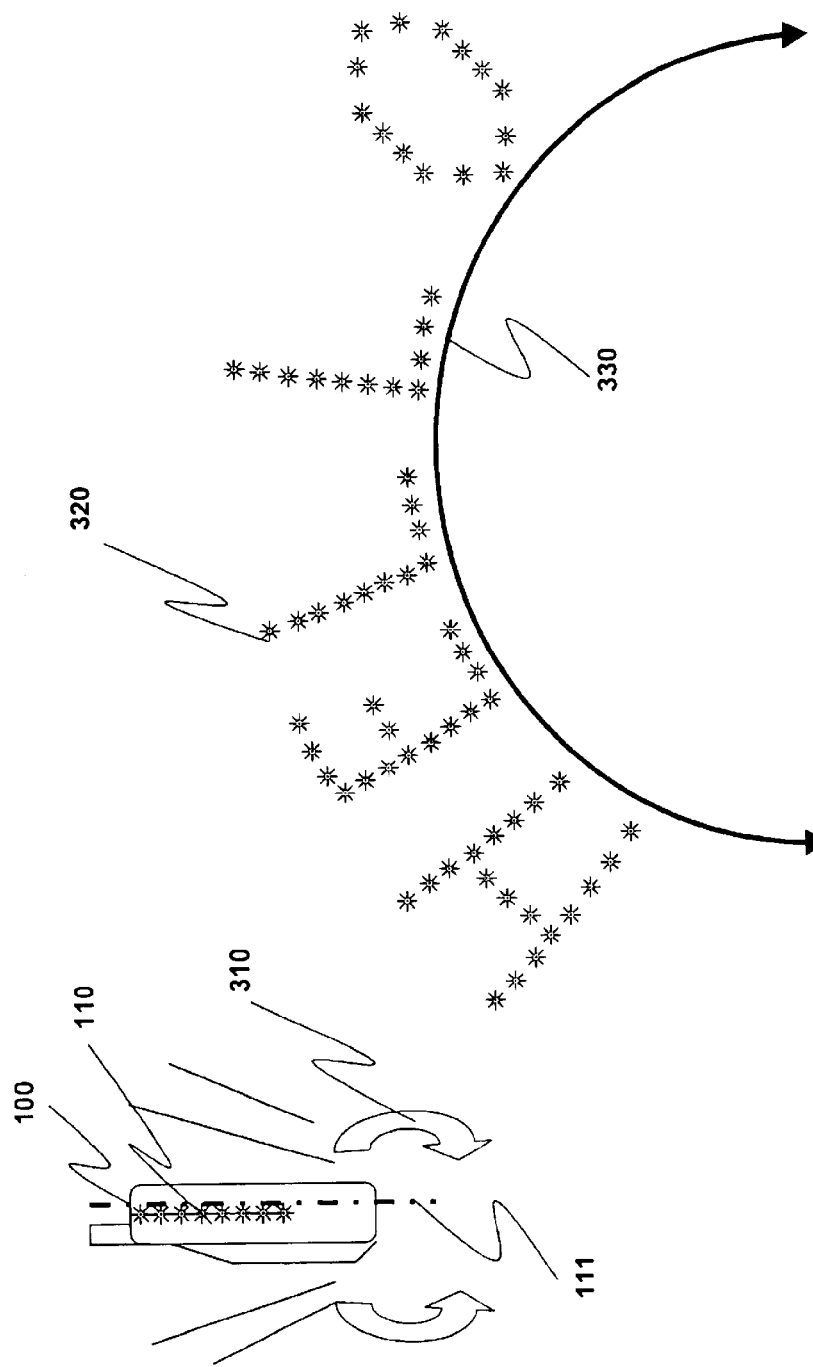
FIG. 3 illustrates effects of different types of motion on the spatial painting of luminescent images using LEDs of a wireless mobile phone, in accordance with one embodiment of the present invention.

FIG. 3 illustrates effects of different types of motion on the spatial painting of luminescent images using LEDs of a wireless mobile phone, in accordance with one embodiment of the present invention. As shown in FIG. 3, the wireless mobile phone 100, having the LEDs 110 embedded in the body casing, is moved in an arcing motion 310. The arcing motion of the wireless mobile phone 100 causes a "bent" luminescent image 320 to be spatially painted. The bent luminescent image 320 follows an arc path 330, i.e., the path of the motion of the wireless mobile phone 100. However, it should be appreciated that the luminescent images may be likewise spatially painted in shapes corresponding to various other paths of motion, beside the side-to-side, top-to-bottom/bottom-to-top, and arc motions described thus far. Moreover, the luminescent textual image may be painted in English or any one of a number of non-English language (such as Chinese), including languages with rendering orientations other than the left-to-right and top-to-bottom orientation of English.

In FIGS. 1–3, the body casing of the wireless mobile phone 100 has the LEDs 110 embedded in a substantially linear manner, along a longitudinal axis 111 of the wireless mobile phone 100. As alluded to earlier, the body casing of the wireless mobile phone 100 may have the LEDs 110 embedded in a variety of orientations with a preferred orientation having at least 8 LEDs arranged so that when the wireless mobile phone 100 is moved, the 8 LEDs form 8 parallel lines spread evenly apart. Alternatively, the wireless mobile phone 100 may have the LEDs 110 embedded in an orientation having at least 16 LEDs arranged to form 8 parallel lines (2 LEDs per line). Additionally, shown in FIGS. 1–3, the body casing of the wireless mobile phone 100 has eight LEDs 110. Eight or nine LEDs is the preferred number, but the number of LEDs may be more or less than eight or nine. Additionally, as described above with respect to FIG. 1, the LEDs shown in FIGS. 1–3 may be a variety of types of LEDs.

As a result, spatial painting of luminescent images may be effectuated utilizing a wireless mobile phone.

Figure 4B:
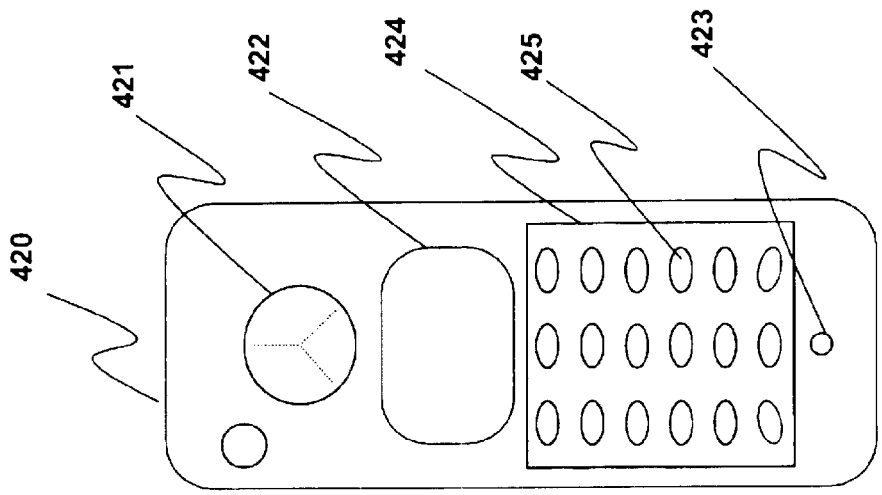
FIGS. 4A & 4B illustrate an alternate embodiment of the present invention for spatially painting luminescent images facilitated by utilizing a wireless mobile phone.
Figure 4A:
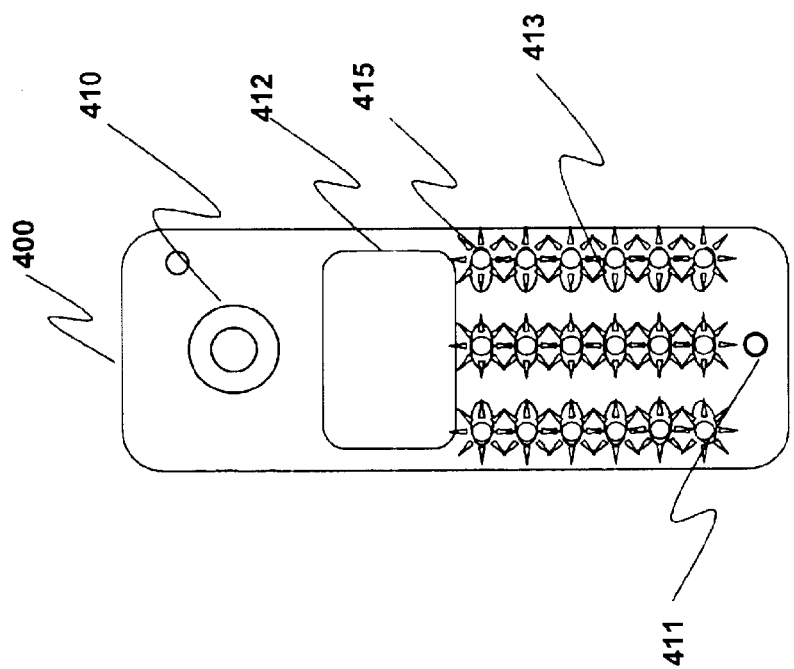

FIGS. 4A & 4B illustrate an alternate embodiment of the present invention for spatially painting luminescent images facilitated by utilizing a wireless mobile phone. FIGS. 4A & 4B show a wireless mobile phone having a body casing comprising two portions. One portion is an exposed wireless mobile phone 400 and the other portion is a covering 420. One embodiment of the covering 420 is described below with respect to FIG. 8B. The exposed wireless mobile phone 400 and the covering 420 are oriented such that the left side of the exposed wireless mobile phone 400 (shown in FIG. 4A) corresponds to the right side of the covering 420 (shown in FIG. 4B), i.e., FIG. 4B is a view of the inside of the covering 420.

Referring to FIG. 4A, the exposed wireless mobile phone 400 includes a speaker 410, a microphone 411, a display 412, and a number of buttons 413. In substantially the same locations as the buttons 413, are a number of LEDs 415 in a matrix arrangement (or multi-row, multi-column linear formations). The LEDs 415 are in the matrix arrangement to closely match the arrangement of the buttons 413 in order for the light of the LEDs to be visible through keys 425 (shown in FIG. 4B) which cover the buttons 413. As previously described, the LEDs 415 (or other light sources) may be of single colors or multi-colors, of the same or different colors. The colors may include red 130, green 131, and blue 132 or other combinations (shown in FIG. 1C). The light sources may be arranged in any geometric configurations, and disposed on one or more exterior surfaces.

Referring now to FIG. 4B, the covering 420 includes a speaker area 421, a display area 422, a microphone area 423, and a keypad 424 on which keys 425 are molded to facilitate the pressing of the buttons 413 on the exposed wireless mobile phone 400 (shown in FIG. 4A). The keypad 424, in particular, the keys 425, may be made of a translucent material to facilitate the viewing of the LEDs 415 disposed beneath, when the covering 420 is in place. In the illustrated embodiment of FIGS. 4A & 4B, a wireless mobile phone has a number of LEDs 415 in a matrix arrangement, placed close to the buttons 413, underneath the keys 425 of the key pad 424, allowing for an external appearance of a conventional wireless mobile phone. However, the LEDs may be arranged in a matrix arrangement on any of the exposed surfaces, such as, but not limited to, the back of a wireless mobile phone. In the illustrated embodiment, once the exposed wireless mobile phone 400 and the covering 420 are attached to each other, light emitted from the LEDs 415 are visible through the keys 425. In a preferred arrangement, three LEDs are underneath each of the keys 425, one red 130, one green 131, and one blue 132 (shown in FIG. 1C).

Figure 5B:
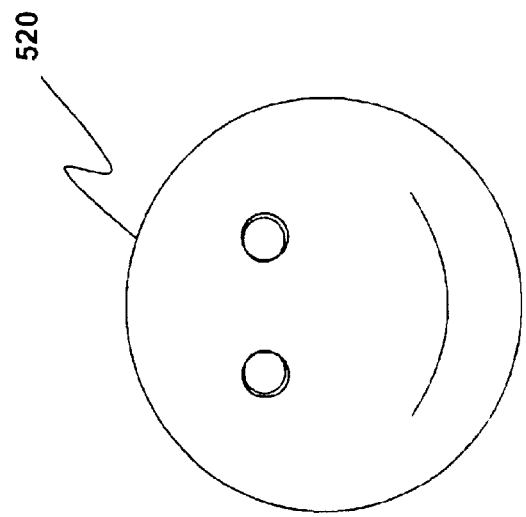
FIGS. 5A & 5B illustrate spatial painting of luminescent images facilitated by utilizing a wireless mobile phone, in particular, utilizing a wireless mobile phone body casing have an increased number of LEDs in a matrix arrangement, in accordance with an alternate embodiment of the present invention.
Figure 5A:
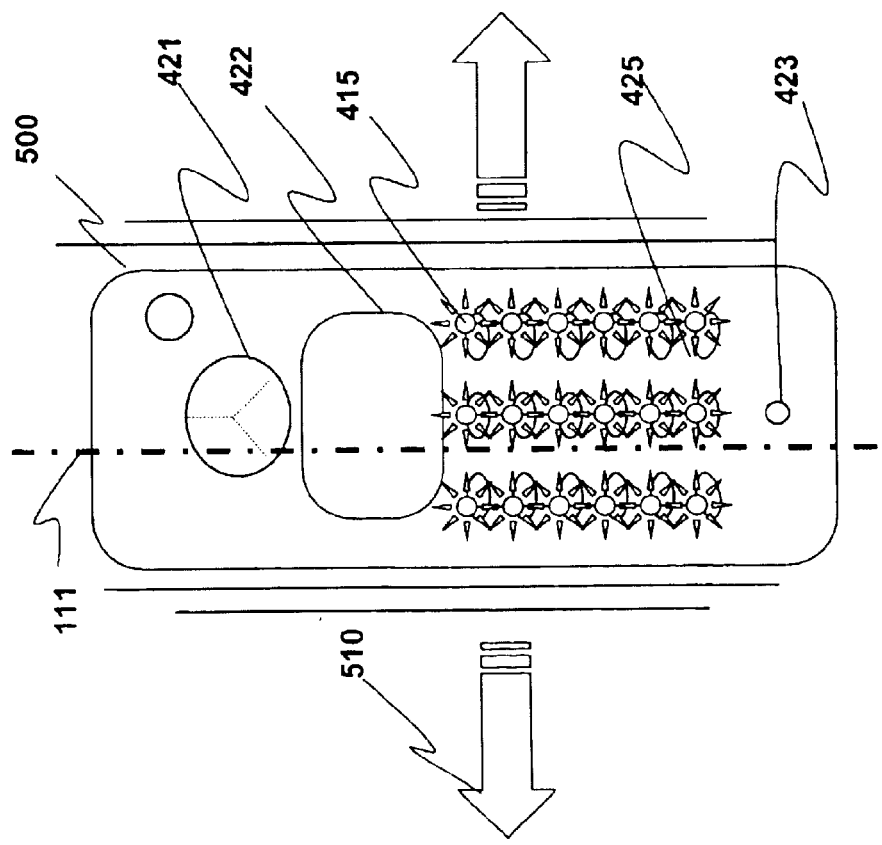

FIGS. 5A & 5B illustrate spatial painting of luminescent images by utilizing a wireless mobile phone such as the one described above in FIGS. 4A & 4B. Shown in FIG. 5A, wireless mobile phone 500 is moved in a side-to-side motion 510, as previously described with respect to FIG. 2. In the one embodiment, the luminescent image painted is a shape, in particular, a simple rendering of a face 520 (shown in FIG. 5B). Additionally, the face 520 may be animated, such as, but not limited to, the face 520 changing shape to visually alter the face 520 in the form of a wink, a smile, and so forth, as wireless mobile phone 500 moves back and forth, and the LEDs are being activated/deactivated.

In one embodiment, the assembled wireless mobile phone 500 (shown in FIG. 5A) may be static, i.e., not moved at all, and the luminescent image, the face 520 (shown in FIG. 5B), may be painted scrolling across the LEDs 415 in the matrix arrangement. Additionally, the luminescent image may also change to be animated as it scrolls across the LEDs 415. For example, the luminescent image may change shape to smile or wink, and so forth.

As described earlier, the number of LEDs may vary. A greater number of LEDs can provide higher resolution images and greater visibility. For example, in addition to the LEDs beneath the keys, LEDs may be also be embedded on or affixed to the covering to provide a larger matrix upon which the luminescent images may be generated and displayed. In one embodiment, the wireless mobile phone includes two parallel rows of LEDs. Each LED in one row has a corresponding LED in the second row, forming a pair of corresponding LEDs. Each corresponding pair of LEDs is turned on and off simultaneously, thereby expanding the amount of light that is produced. In general, the activation and deactivation may be further controlled in a manner that is formation dependent, i.e. depending on how the LEDs are grouped and organized in their placements.

Images, such as the examples shown in FIG. 5B, may be pre-installed in a non-volatile memory (shown as ref. 910 in FIG. 9), or alternatively, may be retrieved from an Internet address, where the address specifications may be in the form of one or more Uniform Resource Identifiers (URI). An image can also be transferred to the mobile phone using instant messaging communications, by a telephone call, or using a graphical manipulation tool on the wireless mobile phone. Text to be displayed can be entered by using any of the text input mechanisms on the mobile phone, such as the keys 425.

In one embodiment, the body casing of the wireless mobile phone may have LEDs embedded in more than one side. For example, a body casing of a wireless mobile phone may have both LEDs embedded in a substantially columnar manner, along a longitudinal axis (shown in FIGS. 1–3) and LEDs disposed below keys (shown in FIG. 4A). In this example, when the wireless mobile phone is moved in two directions 210 & 211 (shown in FIG. 2), the LEDs embedded in the columnar manner, along the longitudinal axis, are activated and deactivated to spatially paint a first luminescent image similar to the luminescent image 220 (shown in FIG. 2). In addition, a second luminescent image is spatially painted by the LEDs disposed below the keys. The second luminescent image having a three-dimensional quality to it, because the second luminescent image moves towards and away from the viewer.

In addition to the motions described, i.e. side-by-side, arc like, and so forth, the present invention may be practiced with other patterns of motions, including in particular, but are not limited to, a circular pattern of motion.

In one embodiment, in addition to employing one group of LEDs to spatially paint images for other viewers, another group of LEDs may be employed to spatially paint the same images, or provide certain visual indicators for the user of the wireless mobile phone. The LEDs visible to the user may aid the user in timing the motion of the wireless mobile phone to spatially paint a clearer luminescent image. As alluded to earlier, the user may be aided by the LEDs, placed for the viewing of the user, spatially painting an identical luminescent image as the one being projected to others. The user moves the wireless mobile phone at a rate to spatially paint a clear luminescent image for himself/herself.

Alternatively, a single timing LED may be employed instead. The timing LED is located in a position such that it is visible by the user while the user is moving the phone as described above. As the wireless mobile phone is in motion, the user tries to maintain a luminescent image of a solid line painted by the timing LED. The optimal speed of movement is the minimum necessary to maintain a view of a solid line. Faster movement causes the image to become compressed. Slower movement causes the image to become unclear or broken. The timing LED maintains an "on" state during the procedure of painting an image. Alternatively, the timing LED may alternate on and off at a rate such that the optimal speed of movement causes a dotted line to be displayed. In yet other embodiments, an audible tone may be employed to guide the user in moving the phone at a speed that yields better visual results. For example, a "beeping" tone may be provided to serve as a guide to the user. In yet other embodiments, tactile feedback, such as vibration, may be provided to guide the user.

As a result, spatial painting of luminescent images, including animated images, is facilitated utilizing a wireless mobile phone.

FIG. 6 illustrates an alternate configuration of a wireless mobile phone for facilitation of spatial painting of luminescent images utilizing a wireless mobile phone in an alternate configuration. As shown in FIG. 6, a wireless mobile phone 600 with inverted placement of antenna and keypad includes a speaker area 601, a number of keys 602 directly below the speaker area 601, a display area 603 disposed below the keys 602, and a microphone area 604. An example of a wireless mobile phone with inverted placement of antenna and keypad is disclosed in related U.S. patent application titled "A WIRELESS MOBILE PHONE WITH INVERTED PLACEMENT OF ANTENNA AND INPUT KEYPAD", Ser. No. 09/767,526 filed Jan. 22, 2001, the subject matter of which is incorporated herein by reference. Additionally, the body casing has LEDs 610 disposed on one of its side exterior surface, parallel to the longitudinal axis 111 and opposite an antenna 605, in accordance with the teachings of the present invention. As previously described, the body casing of the wireless mobile phone 600 may have LEDs 610 disposed in a variety of alternative manners, such as, but not limited to, a matrix arrangement disposed beneath keys 615. Additionally, as previously described, the wireless mobile phone 600 may spatially paint luminescent messages either when in motion or when static, based at least upon the number and arrangement of the LEDs 610. The wireless mobile phone 600 with inverted placement of antenna and keypad facilitates augmenting the motion of the wireless mobile phone as will be described in the text accompanying FIGS. 7A & 7B.

FIGS. 7A & 7B illustrate means for augmenting motion of a wireless mobile phone utilized to spatially paint a luminescent image, in accordance with one embodiment of the present invention. As shown in FIG. 7A, a wireless mobile phone 700 is in an inverted configuration with LEDs 710 disposed beneath the keys 702. In FIG. 7A, a cantilever attachment 705 is attached to an antenna 706 extending in a vertical direction, parallel to the longitudinal axis 111, below the bottom surface of the wireless mobile phone 700. This addition of the lever arm to the wireless mobile phone 700 facilitates an increase in the rate of the side-to-side motion when wireless mobile phone is held by the cantilever attachment 705, i.e., an increase in the angular acceleration of the inverted configuration wireless mobile phone 700. In the embodiment shown in FIG. 7A, the cantilever attachment 705 is used to move the inverted wireless mobile phone 700 in a side-to-side motion 715. This augmenting of velocity of the side-to-side motion 715 improves the resolution of the luminescent images. In various embodiments, the cantilever attachment 705 is made of an elastomeric material, such as, but not limited to, rubber, to enhance the forced vibration resulting from the added cantilever attachment of the inverted wireless mobile phone.

Shown in FIG. 7A, the cantilever attachment 705 is a separate part attached to the antenna 706. However, the cantilever attachment 705 may be any type of extension for increasing the rate of motion of the wireless mobile phone 700 such as, but not limited to, a relatively extended one-piece antenna attached to the body casing. Additionally, this type of augmenting of the motion of a wireless mobile phone may be applied to any type of wireless mobile phone utilized to facilitate generation and display of luminescent images. When the present invention is practiced on a wireless mobile phone having an antenna located on the top of the phone, the graphic or text image displayed can be inverted in order to be viewed appropriately when the user holds the phone in an inverted position, with the antenna pointed downward.

Referring now to FIG. 7B, one embodiment of a wireless mobile phone 700 with inverted placement of antenna and keypad is illustrated, having the LEDs 710 disposed parallel to the longitudinal axis 111 on the side opposite a bending antenna 720. In FIG. 7B, the bending antenna 720 is shown bent 90 degrees to the vertical at a bend point 721. The bending antenna 720 is held by a user at a handle 722 with the handle 722 locked in the bent position. The locking of the bent position may be achieved by any known mechanical locking method. The user proceeds to rotate the wireless mobile phone 700 about the handle 722 facilitating a higher rate of rotation of the wireless mobile phone 700. This higher rate of rotation improves the resolution of the luminescent images. Here again, the placement of the LEDs 710 may be in any location in/on the wireless mobile phone 700, and the bending antenna 722 may be configured to bend in alternate directions in order face the LEDs 710 towards the most effective direction. While FIG. 7B illustrates how a wireless mobile phone with inverted placement of antenna and keypad may be augmented to allow a user to control spatial movement, traditionally oriented wireless mobile phone may also be augmented in a similar manner.

As a result, motion of a wireless mobile phone utilized to facilitate spatial painting of luminescent images may be augmented, in accordance with one embodiment of the present invention.

Figure 8B:
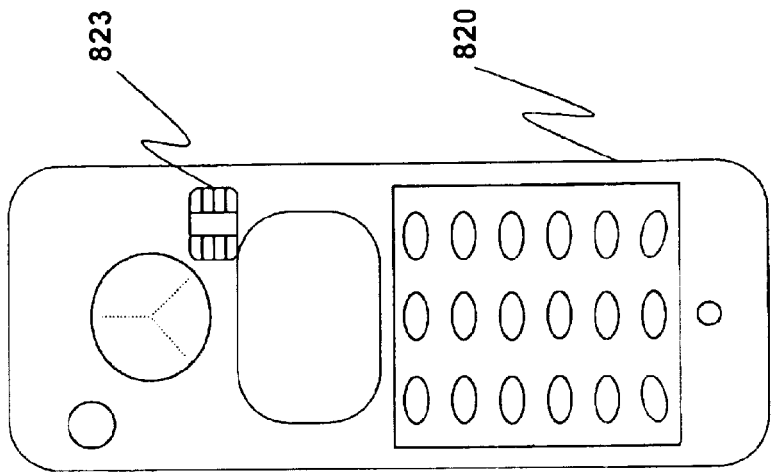
FIGS. 8A–8C illustrate spatial painting of luminescent images utilizing a wireless mobile phone having a body casing comprising two portions, one of which is interchangeable, in accordance with the teachings of the present invention.
Figure 8A:
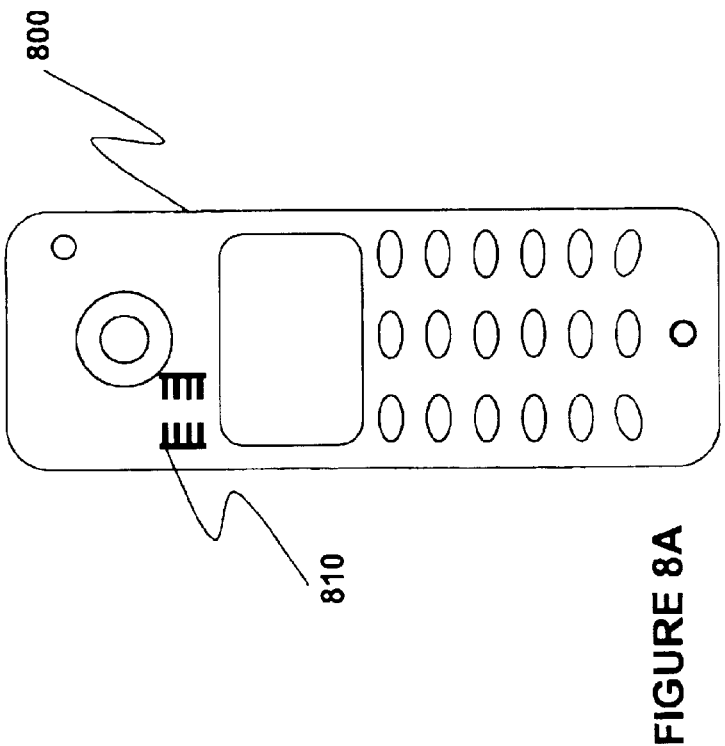
Figure 8C:
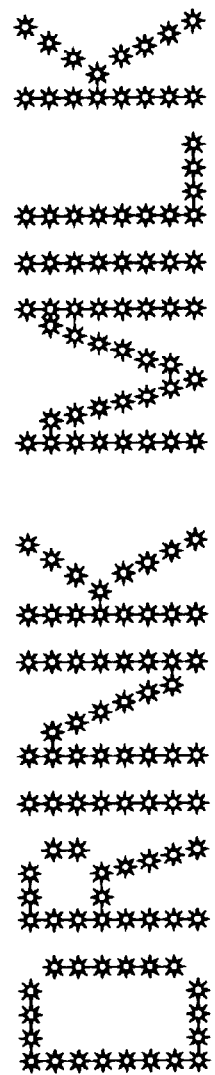

FIGS. 8A–8C illustrate spatial painting of luminescent images utilizing a wireless mobile phone having a body casing comprising two portions, one of which is interchangeable, in accordance with the teachings of the present invention. FIGS. 8A & 8B show a wireless mobile phone having a body casing comprising an exposed wireless mobile phone 800 and an interchangeable covering 820. The exposed wireless mobile phone 800 and the interchangeable covering 820 are oriented such that the left side of the exposed wireless mobile phone 800 (shown in FIG. 8A) corresponds to the right side of the interchangeable covering 820 (shown in FIG. 8B), i.e., FIG. 8B is a view of the inside of the interchangeable covering 820. In accordance with one embodiment of the present invention, interchangeable covering 820 includes an embedded electronic component 823 having data/programming for generating and displaying luminescent images corresponding to a theme of the interchangeable covering 820. An example of an interchangeable covering is disclosed in related U.S. patent application titled "METHOD AND APPARATUS FOR PERSONALIZING MOBILE ELECTRONIC DEVICES INCLUDING INTERCHANGEABLE COVERINGS WITH EMBEDDED PERSONALITY", Ser. No. 10/087,098, filed Mar. 1, 2002, the subject matter of which is incorporated herein by reference. The data and/or programming logic to control the activation and deactivation of LEDs to facilitate spatial painting of luminescent messages may be stored in an electronic component of the wireless mobile phone such as a non-volatile memory (shown as ref. 910 in FIG. 9), or alternatively, in the electronic component 823 of the interchangeable covering 820. The electronic component may be a microprocessor, a memory, a combination of both, or other electronic components of the like.

In the embodiment shown in FIGS. 8A–8C, electronic component 823 of the interchangeable covering 820 may include a theme, such as, but not limited to, dairy products. The data and/or programming logic stored in the electronic component 823 of the interchangeable covering 820 may include images related to dairy products. Once a user attaches the interchangeable covering 820 to the wireless mobile phone having a coupler 810 to form an interface with the electronic component 823, a luminescent image that is automatically generated and displayed may be a dairy related image, shown for example in FIG. 8C. Additionally, the luminescent image generated and displayed may be a luminescent image of a cow, and so forth.

In FIGS. 8A–8C, as previously described, LEDs may be disposed in a variety of ways contemplated within the spirit and scope of the invention on the exposed wireless mobile phone 800 and/or interchangeable covering 820. In various embodiments, interchangeable covering 820 may be an interchangeable faceplate, while in other embodiments, covering 820 may be an interchangeable "skin".

As a result, spatial painting of luminescent images utilizing a wireless mobile phone is facilitated incorporating interchangeable coverings is described, in accordance with the teachings of the present invention.

Figure 9:
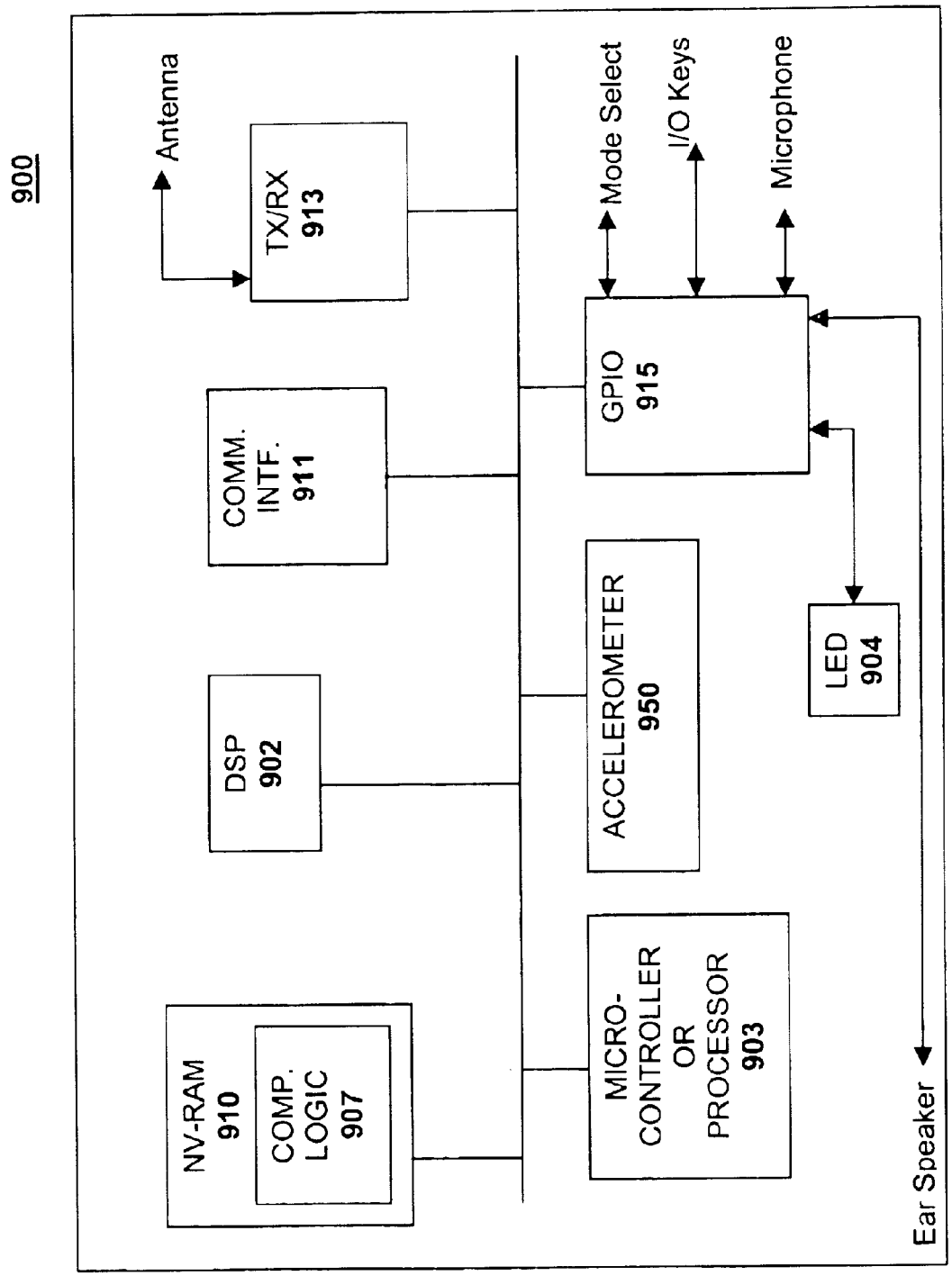
FIG. 9 illustrates an internal component view of a wireless client device such as wireless mobile phone, in accordance with one embodiment of the present invention.

FIG. 9 illustrates an internal component view of a wireless client device such as a wireless mobile phone (shown as refs. 100, 400, 500, 600, 700, and 800), in accordance with one embodiment of the present invention. As illustrated, wireless device 900 includes elements found in conventional mobile client devices such as micro-controller/processor 903, digital signal processor (DSP) 902, communication interface 911, transmitter/receiver (TX/RX) 913 (also known as transceiver), and general-purpose input/output (GPIO) 915. Except for the teachings of the present invention, these elements perform their conventional functions known in the art. In particular, TX/RX 913 may support one or more of any of the known signaling protocols, including, but not limited to, code division multiple access (CDMA), time division multiple access (TDMA), global system for mobile communications (GSM), cellular digital packet data (CDPD), and so forth. Similarly, communication interface 911 may support one or more wireless communication protocols including, but not limited to, infrared, Bluetooth, IEEE 802.11b, and so forth. It should be noted that one or more of these elements may be omitted without departing from the spirit and scope of the invention. For example, since the luminescent images are generated and displayed utilizing wireless mobile phones, speaker and microphone of wireless mobile phone (shown as refs. 100, 400, 500, 600, 700, and 800) may be omitted because the luminescent images may be communicative in nature, but however, this need not be the case. As their constitutions are known, these elements will not be further described.

Wireless mobile phone 900 includes LEDs 904, and complementary logic 907 for LEDs 904 hosted by the non-volatile memory 910. Complementary logic 907 includes logic executed by the micro-controller/processor 903 to selectively activate the LEDs 904 (shown as refs. 110, 415, 610, and 710). In one embodiment, the complementary logic causes the micro-controller/processor 903 to selectively activate the LEDs 904 to generate and display luminescent images.

Additionally shown in FIG. 9 is an accelerometer 950 to transmit data signals to the micro-controller/processor 903 regarding changes in acceleration corresponding to changes in direction of motion of the wireless mobile phone 900. In order to accommodate the small size of the components in a wireless mobile phone 900, the accelerometer may be any type of micro-miniature accelerometers known, such as, but not limited to, a piezoelectric micro-miniature accelerometer. The accelerometer 950 sends signals to the micro-controller/processor 903 to coordinate the selective activation of the LEDs 904. In alternate embodiments, other mechanisms for sensing one or more movement attributes indicative of the spatial movement of the phone, such as the movement speed or rate, may also be employed instead.

Figure 10:
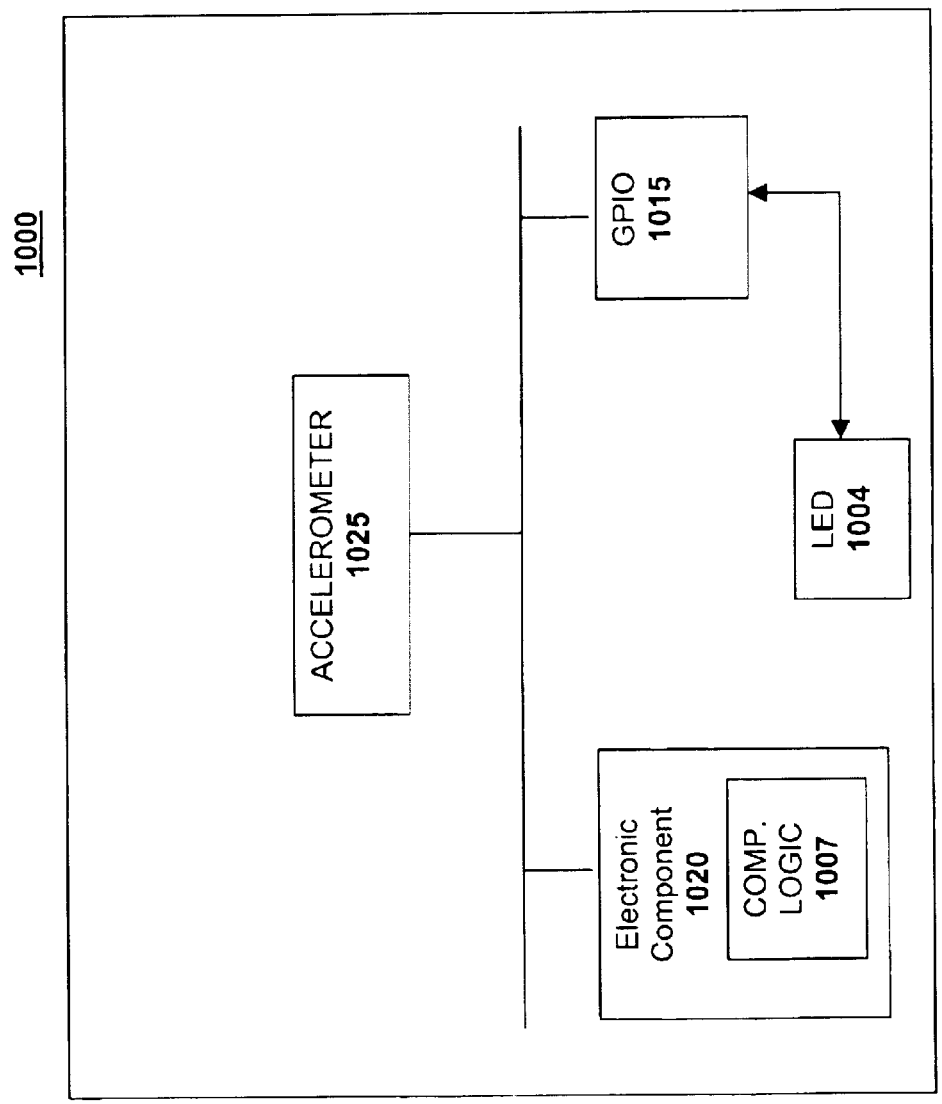
FIG. 10 illustrates an internal component view of storage/microprocessor chip embedded in an interchangeable covering, such as the storage/microprocessor chip, in accordance with one embodiment of the present invention.

FIG. 10 illustrates an internal component view of an interchangeable covering having an electronic component, such as the electronic component 823 of FIG. 8, in accordance with one embodiment of the present invention. As illustrated, interchangeable covering 1000 has an embedded electronic component 1020. The electronic component may be a microprocessor, a memory, or a combination of both. Additionally, the interchangeable covering 1000 optionally includes elements such as GPIO 1015 and an accelerometer 1025.

The interchangeable covering 1000 includes LEDs 1004, and complementary logic 1007 for the LEDs 1004 hosted by the electronic component 1020. The complementary logic 1007 includes logic executed by the electronic component 1020 to selectively activate the LEDs 1004, where these LEDs may be disposed in the interchangeable covering or disposed in the body casing (shown as refs. 110, 415, 610, and 710). The complementary logic 1007 in the interchangeable covering 1000 may be executed to selectively activate LEDs in a body casing to spatially paint a pre-stored luminescent image, such as the luminescent image shown in FIG. 8C. Alternatively, the complementary logic 1007 in the interchangeable covering 1000 may be executed to selectively activate LEDs 1004 in the interchangeable covering 1000 itself.

Figure 11:
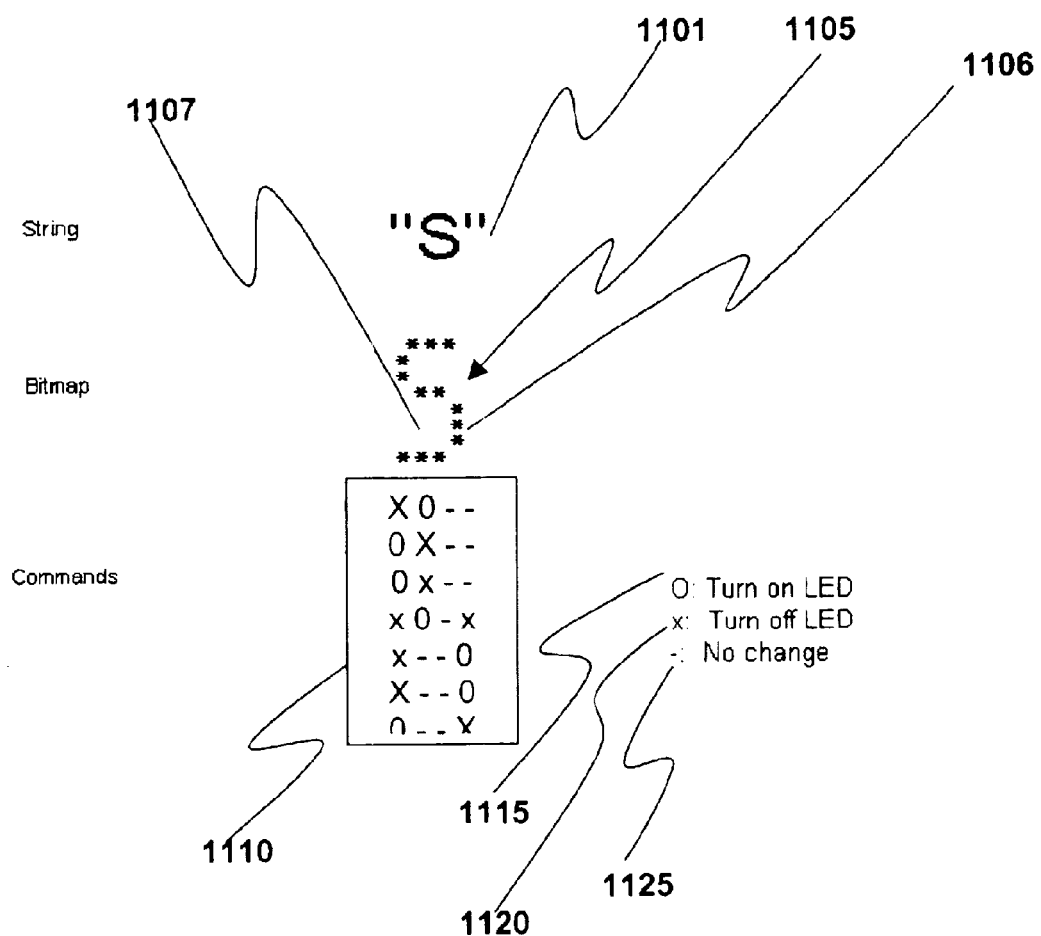
FIG. 11 illustrates an operational flow of the complementary logic as it applies to the facilitation of spatially painting luminescent images utilizing a wireless mobile phone, in accordance with one embodiment of the present invention.

FIG. 11 illustrates turning on and off LEDs to spatially paint a luminescent image, in accordance with one embodiment of the present invention. Shown in FIG. 11, is an example of a specification of an image 1101 to be spatially painted, such as, but not limited to, a text string of a single character, "S". Also shown in FIG. 11, is a bitmap 1105 corresponding to the specification of the image 1101. The bitmap 1105 is shown comprising of asterisks 1106 representing LEDs lit at particular points of a spatial movement cycle to spatially paint the luminescent specification of the image 1101. Blank areas 1107 of the bitmap 1105 represent LEDs being turned off at the various points of the spatial movement cycle. A movement cycle is movement from one extreme end spatial position to another, e.g. from the left spatial end to the right spatial end, or from the right spatial end to the left spatial end.

In one embodiment, LEDs are turned on, turned off, or have the on/off state maintained (i.e. unchanged) based at least upon a matrix of commands 1110. The matrix of commands 1110 is translated from the specification of the image 1101, and corresponds to a cycle of activity for the LEDs. As shown in FIG. 11, the matrix of commands 1110 includes commands to turn LEDs on ("O") 1115, commands to turn LEDs off ("X") 1120, and commands to leave LEDs unchanged ("-") 1125 for the various points of the spatial movement cycle. The commands occupying the same column position in matrix 1100 are executed at the same time. In FIG. 11, the commands illustrated are for an exemplary left to right movement (from the viewer's perspective). The corresponding commands for the reverse right to left movement may be derived from the illustrated commands by "transposing" the "first" "on" command and the "last" "unchanged" command of each sequence of "on" and "unchanged" commands of each row. For example, the illustrated sequence of "O - - - " of the first row (executed from left to right) for the left to right movement is changed to " - - - O" for the reverse right to left movement (executed from right to left). The leave unchanged command ("-") 1125 helps prevent LEDs from having unnecessary commands, i.e., when LEDs already have the turn on ("O") 1115 or the turn off ("X") 1120 commands, and the LEDs are to remain "on" or "off" correspondingly. Under these circumstances, the on/off commands need not be repeated for these LEDs.

The embodiment shown in FIG. 11 illustrates a specification of an image for a text string having a single character. However, as previously described, the specification of the image may comprise a text string having multiple characters or may be part of an image, such as the image shown in FIG. 5B. If specification of an image comprises a text string of multiple characters, a command to turn all of the LEDs off after spatially painting each letter may also be implemented.

Figure 12:
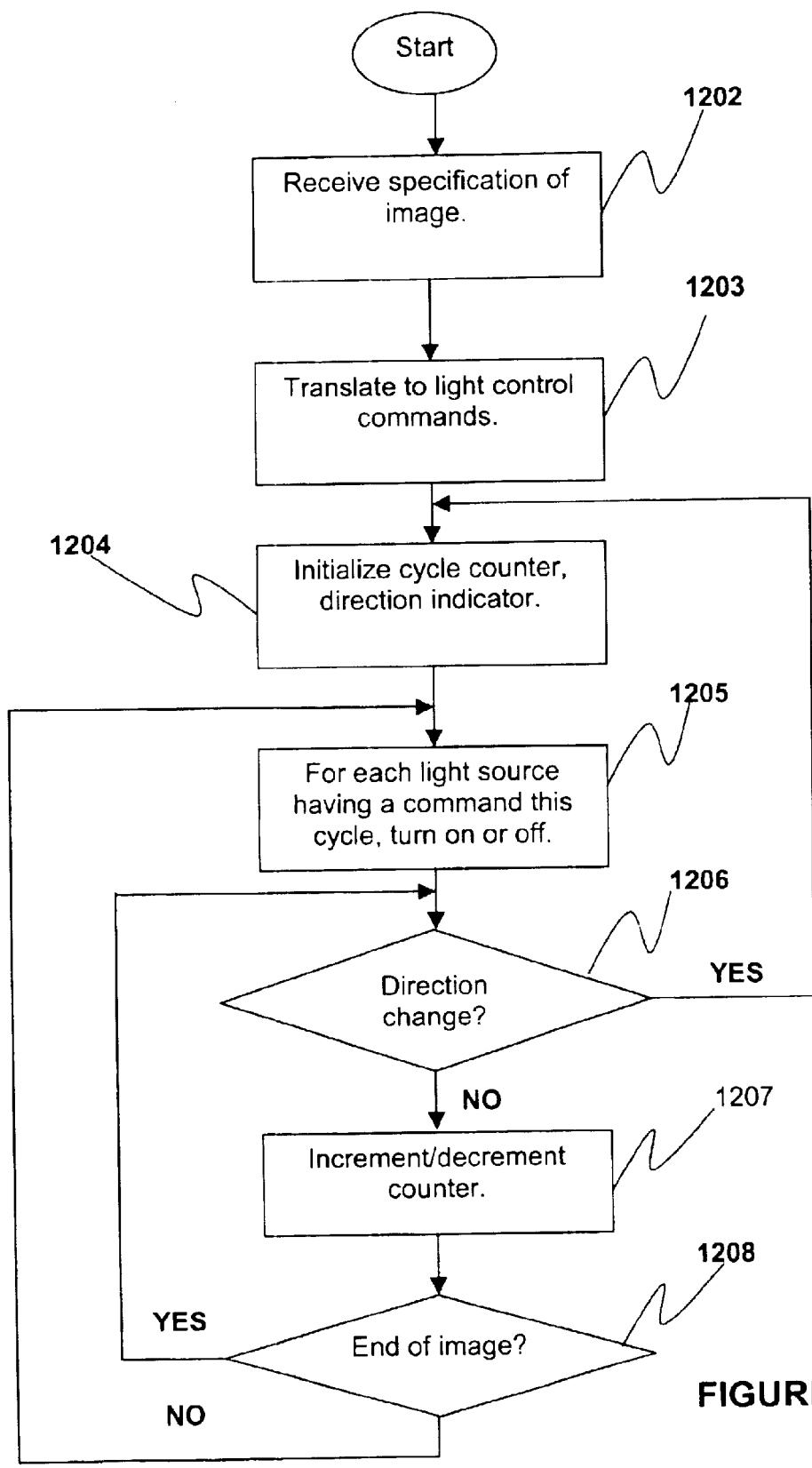
FIG. 12 illustrates an operational flow of the complementary logic as it applies to the facilitation of spatially painting luminescent images utilizing a wireless mobile phone, in accordance with one embodiment of the present invention.

FIG. 12 illustrates an operational flow of the complementary logic as it applies to the facilitation of spatially painting luminescent images utilizing a wireless mobile phone, in accordance with one embodiment of the present invention. The process begins at block 1202 where a specification of an image to be spatially painted is received. As described earlier, the luminescent image is to be spatially painted using the LEDs. The specification of the image is translated to a matrix of commands to turn the LEDs on, off, or to leave the LEDs unchanged 1203.

Once the specification of the image is translated to a matrix of commands, a cycle counter is initialized, and as previously described, an accelerometer may provide an indication of direction of motion to display non-direction dependent image 1204, i.e., preventing backward images. The matrix of commands is utilized to turn on, to turn off, and to leave unchanged LEDs during a cycle of activity of the LEDs 1205.

At the end of the cycle of activity of the LEDs, it is determined if a change in direction of motion is detected 1206. If a change in direction of the motion is detected, the cycle counter is initialized again with an indication of direction to spatially paint the image in a reverse direction in order to prevent a backward image. However, if the direction of motion is not changed, an increment or decrement of the specification of the image is counted, i.e., the subsequent images or parts of the images to be spatially painted 1207.

As the specification of the image is spatially painted in increments or decrements, it is determined if the end of the image is reached 1208. If the end of the image is spatially painted, i.e., the specification of the image has been completely spatially painted, it is determined if a change in direction of the motion is detected. However, if the end of the image has not been spatially painted, the activity of the LEDs is continued.

Certain embodiments may include additional components, may not require all of the above components, or may combine one or more components.

In one embodiment, the invention, as described above, is implemented using one or more micro-controller/processor. In one embodiment, the present invention is implemented using software routines executed by one or more micro-controller processors.

In one embodiment, the software routines are written in the C programming language. It should be appreciated that the software routines may be implemented in any of a wide variety of programming languages. In alternate embodiments, the invention is implemented in discrete hardware or firmware. For example, one or more application specific integrated circuit (ASICs) could be programmed with one or more of the above described functions to selectively activate a subset of a number of LEDs. In another example, one or more functions for spatially painting luminescent images could be implemented in one or more ASICs on additional circuit boards, and the circuit boards could be inserted into wireless mobile phone or the interchangeable covering described above. In another example, field programmable gate arrays (FPGAs) or static programmable gate arrays (SPGAs) could be used to implement one or more functions of the invention. In yet another example, a combination of hardware and software could be used to implement one or more functions of the invention.

Thus, spatially painting luminescent images utilizing a wireless mobile phone has been described. While the present invention has been described in terms of the above-illustrated embodiments, one skilled in the art will recognize that the present invention is not limited to the embodiments described. The present invention can be practiced with modification and alternation within the spirit and scope of the appended claims. Thus, the description is to be regarded as illustrative instead of restrictive on the present invention.

What is claimed is:

1. A wireless mobile communication device comprising:
   a wireless receiver adapted to wirelessly receive audio, textual or graphics data;
   an input keypad having a plurality of keys to facilitate input of textual or graphics data;
   a plurality of externally visible light sources;
   a storage medium having instructions stored therein, the instructions having been designed to selectively control the receiver, the input keypad and the light sources to integrally facilitate a user to selectively communicate audibly, textually or visually with others, with the visual communication including spatial painting of luminescent images; and
   a processor coupled to receiver, the input keypad, the light sources and the storage medium to execute the instructions;
   wherein
   the light sources comprise a first and a second subset disposed in a first and a second complementary manner respectively, with the first disposition manner designed for perception of the first subset by another to whom the user wishes to visually communicate the textual or graphics data, and the second complementary disposition manner designed for perception of the second subset by the user while the first subset is perceived by the other; and
   the instructions are designed to selectively activate and deactivate selected ones of the first subset while the wireless mobile communication device is being spatially moved, to spatially paint luminescent images of textual or graphics data to be visually communicated to another, and to selectively activate and deactivate selected ones of the second subset while the wireless mobile communication device is being spatially moved, to guide the user in moving the wireless mobile communication device, the second subset spatially painting a complementary substantially legible luminescent image, when the wireless mobile communication device is being appropriately moved.

2. The wireless mobile communication device of claim 1, wherein the instructions are designed to selectively activate and deactivate the second subset to spatially paint a complementary substantially continuous line or arc when the wireless mobile communication device is being appropriately moved.

3. The wireless mobile communication device of claim 1, wherein the instructions are designed to selectively activate and deactivate the second subset to spatially paint duplicate luminescent images of the textual or graphics data to be visually communicate to another, the duplicate luminescent images of the textual or graphics data being substantially legible when the wireless mobile communication device is being appropriately moved.

4. A wireless mobile communication device comprising,
   a wireless receiver adapted to wirelessly receive audio, textual or graphics data;
   an input keypad having a plurality of keys to facilitate input of textual or graphics data;
   a plurality of externally visible light sources;
   a storage medium having instructions stored therein, the instructions having been designed to selectively control the receiver, the input keypad and the light sources to integrally facilitate a user to selectively communicate audibly, textually or visually with others, with the visual communication including spatial painting of luminescent images; and
   a processor coupled to receiver, the input keypad, the light sources and the storage medium to execute the instructions;
   wherein the input keypad comprises an array of input keys and at least a subset of the externally visible light sources are co-located with the input keys of the input keypad, and the instructions are adapted to selectively activate and deactivate selected ones of the light sources to facilitate the user to visually communicate 3-D graphics to another.

5. The wireless mobile communication device of claim 4, wherein the subset of light sources comprises different single color light sources, and multiple different single color light sources are associated with each input key, to enable the instructions to spatially paint the luminescent images of the text or graphics data in color.

6. A wireless mobile communication device comprising,
   a wireless receiver adapted to wirelessly receive audio, textual or graphics data;
   an input keypad having a plurality of keys to facilitate input of textual or graphics data;
   a plurality of externally visible light sources;
   a storage medium having instructions stored therein, the instructions having been designed to selectively control the receiver, the input keypad and the light sources to integrally facilitate a user to selectively communicate audibly, textually or visually with others, with the visual communication including spatial painting of luminescent images; and
   a processor coupled to receiver, the input keypad, the light sources and the storage medium to execute the instructions;
   wherein the light sources comprise different single color light sources organized in groups, with each group having multiple different single color light sources, to enable the instructions to spatially paint the luminescent images of the text or graphics data in color.

7. A wireless mobile communication device comprising
   a wireless receiver adapted to wirelessly receive audio, textual or graphics data;
   an input keypad having a plurality of keys to facilitate input of textual or graphics data;
   a plurality of externally visible light sources;
   a storage medium having instructions stored therein, the instructions having been designed to selectively control the receiver, the input keypad and the light sources to integrally facilitate a user to selectively communicate audibly, textually or visually with others, with the visual communication including spatial painting of luminescent images; and
   a processor coupled to receiver, the input keypad, the light sources and the storage medium to execute the instructions;
   wherein an interchangeable cover having an electronic component disposed on the inside surface having data or instructions to provide the wireless mobile communication device with the textual or graphics data to be visually communicated to another.

8. The wireless mobile communication device of claim 7, wherein the interchangeable cover further comprises an exterior surface having a graphics design conveying a theme, and the textual or graphics data to be visually communicated to another, provided by the data or instructions stored in the electronic component of the cover, are related to the theme.

9. A wireless mobile communication device comprising,
   a wireless receiver adapted to wirelessly receive audio, textual or graphics data;
   an input keypad having a plurality of keys to facilitate input of textual or graphics data;
   a plurality of externally visible light sources;
   a storage medium having instructions stored therein, the instructions having been designed to selectively control the receiver, the input keypad and the light sources to integrally facilitate a user to selectively communicate audibly, textually or visually with others, with the visual communication including spatial painting of luminescent images; and
   a processor coupled to receiver, the input keypad, the light sources and the storage medium to execute the instructions;
   wherein the instructions are further designed to generate a bit map for the luminescent image of the textual or graphics data to be visually communicated to others, having a plurality of specifications specifying operations to be performed on the light sources, including one or more specifications specifying no operations are to be performed on one or more of the light sources, leaving the light sources at their current states for at least a time period.

10. An interchangeable cover of a wireless mobile communication device comprising
    a cover body designed to removably mate with the wireless mobile communication device; and
    an electronic component disposed on an interior surface of the cover body, having stored therein data or instructions to provide the wireless mobile communication device with textual or graphics data to be visually communicated to another, the wireless mobile communication device being equipped to facilitate visual as well as audio communication between a user of the wireless mobile communication device and others, and the visual communication including spatial painting of luminescent images.

11. The interchangeable cover of claim 10, wherein the cover further comprises an exterior surface having a graphics design conveying a theme, and the textual or graphics data to be visually communicated to another, provided by the data or instructions stored in the electronic component of the cover, are related to the theme.

12. The interchangeable cover of claim 10, wherein the electronic component further comprises additional instructions designed to selectively activate or deactivate a plurality of externally visible light sources to effectuate the visual communication to another, the textual or graphics data provided by the data or instructions stored in the electronic component of the cover, the additional instructions providing the visual communication capability to the wireless mobile communication device, which otherwise is equipped to facilitate non-visual communication.

13. The interchangeable cover of claim 10, wherein the cover further comprises a plurality of externally visible light sources adapted to be controllable by a processor of the wireless mobile communication device to effectuate visual communication to another, the textual or graphics data provided instructions stored in the electronic component of the cover.

14. An interchangeable cover of a wireless mobile communication device comprising
    a cover body designed to removably mate with the wireless communication device; and
    an electronic component disposed on an interior surface of the cover body, having stored therein instructions to enable the wireless mobile communication device to selectively activate or deactivate a plurality of externally visible light sources to facilitate a user in visually communicating textual or graphics data to another, the visual communication including spatial painting of luminescent images, and the wireless mobile communication device without the interchangeable cover, being equipped to merely facilitate non-visual communication between the user and others.

15. The interchangeable cover of claim 14, wherein the cover further comprises a plurality of externally visible light sources adapted to be controllable by a processor of the wireless mobile communication device to effectuate visual communication to another, the textual or graphics data.

16. An interchangeable cover of a wireless, mobile communication device comprising
    a cover body designed to removably mate with the wireless communication device; and
    a plurality of light sources disposed on an exterior surface of the cover body, and adapted to be controllable by a processor of the wireless mobile communication device to facilitate a user to visually communicate textual or graphics data to another, the visual communication including spatial painting of the luminescent images, and the wireless mobile communication device, without the interchangeable cover, being merely equipped to facilitate non-visual communication between the user and others.

* * * * *

UNITED STATES PATENT AND TRADEMARK OFFICE
CERTIFICATE OF CORRECTION

| | | |
|---|---|---|
| PATENT NO. | : 6,954,658 B2 | Page 1 of 1 |
| APPLICATION NO. | : 10/334736 | |
| DATED | : October 11, 2005 | |
| INVENTOR(S) | : G. Eric Engstrom and Peter Zatloukal | |

It is certified that error appears in the above-identified patent and that said Letters Patent is hereby corrected as shown below:

Column 18
Line 14, "...provided instructions stored..." should read --...Provided by the data or instructions stored...--.

Signed and Sealed this

Third Day of April, 2007

JON W. DUDAS
*Director of the United States Patent and Trademark Office*